US012399953B2

(12) United States Patent
Tadokoro

(10) Patent No.: US 12,399,953 B2
(45) Date of Patent: Aug. 26, 2025

(54) SYSTEMS AND METHODS FOR SAMPLING SIGNALS TO DERIVE INFORMATION AT TARGET FREQUENCIES ABOVE A DETECTABLE RANGE

(71) Applicant: Toyota Motor Engineering & Manufacturing North America, Inc., Plano, TX (US)

(72) Inventor: Yukihiro Tadokoro, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 384 days.

(21) Appl. No.: 17/980,854

(22) Filed: Nov. 4, 2022

(65) Prior Publication Data
US 2024/0149887 A1 May 9, 2024

(51) Int. Cl.
*G06F 17/14* (2006.01)
*B60W 40/107* (2012.01)

(52) U.S. Cl.
CPC ......... *G06F 17/141* (2013.01); *B60W 40/107* (2013.01); *B60W 2420/408* (2024.01); *B60W 2554/4049* (2020.02)

(58) Field of Classification Search
CPC ......... B60W 40/107; B60W 2420/408; B60W 2554/4049; G06F 17/141; G01S 7/2883;
(Continued)

(56) References Cited

U.S. PATENT DOCUMENTS 4,866,449 A * 9/1989 Gaffney ............... H03D 7/165
342/194
8,473,233 B1 6/2013 Giust
(Continued)

FOREIGN PATENT DOCUMENTS

CN 102082548 A * 6/2011

OTHER PUBLICATIONS

M. Takahashi, K. Ogawa and K. S. Kundert, "VCO jitter simulation and its comparison with measurement," Proceedings of the ASP-DAC '99 Asia and South Pacific Design Automation Conference 1999 (Cat. No. 99EX198), Hong Kong, China, 1999, pp. 85-88 vol. 1, doi: 10.1109/ASPDAC.1999.759717. (Year: 1999).*
(Continued)

*Primary Examiner* — Vladimir Magloire
*Assistant Examiner* — Ashley Brown Raynal
(74) *Attorney, Agent, or Firm* — Christopher G. Darrow; DARROW MUSTAFA PC

(57) ABSTRACT

System, methods, and other embodiments described herein relate to sampling signals to derive information from a target frequency outside a detectable range by exploiting physical phenomena. In one embodiment, a method includes sampling, by a detector with an oscillator, a signal at sampling times to acquire a target frequency, the sampling times having an offset associated with random jitter and the target frequency is outside a detectable range for the sampling times. The method also includes computing a sample average associated with the sampling times for component frequencies of the signal using a discrete Fourier transform (DFT). The method also includes, in response to the sample average satisfying a threshold for the target frequency, extracting information by the detector for the target frequency at one of the component frequencies. The method
(Continued)

also includes modifying control of a device using the information.

20 Claims, 5 Drawing Sheets

(58) Field of Classification Search
CPC . G01S 7/356; G01S 2013/9316; G01S 13/931
See application file for complete search history.

(56) References Cited

U.S. PATENT DOCUMENTS

| | | | |
|---|---|---|---|
| 9,313,072 | B2 | 4/2016 | Katabi et al. |
| 9,450,597 | B1 | 9/2016 | Ahmed et al. |
| 2009/0121918 | A1* | 5/2009 | Shirai .................... G01S 7/023 342/159 |

OTHER PUBLICATIONS

Wiesenfeld et al. "Stochastic resonance and the benefits of noise: from ice ages to crayfish and SQUIDs," Nature, vol. 373, No. 6509, 1995, pp. 33-36.

McDonnell et al., "The benefits of noise in neural systems: bridging theory and experiment," Nat. Rev. Neurosci., vol. 12, No. 7, 2011, pp. 415-426.

Gammaitoni et al., "Stochastic resonance," Rev. Mod. Phys., vol. 70, No. 1, 1998, pp. 223-287.

Chen et al., "Noise-Enhanced Information Systems," Proc. IEEE, vol. 102, No. 10, 2014, pp. 1-14.

Y. Tadokoro, "Weighted combining of the moments in few-bit ADC," TMNA Technical Report, TRI2106-023, 2021, pp. 1-7.

Y. Tadokoro, "Designing a demodulation method with few-bit ADC," TMNA Technical Report, TRI2106-225, 2021, 8 pages.

W. M. Brown, "Sampling with random jitter," SIAM J. Appl. Math., vol. 11, No. 2, 1963, pp. 460-473.

Kim et al., "Modeling random clock jitter effect of high-speed current-steering NRZ and RZ DAC," IEEE Trans. Circuits Syst. I, Reg. Papers, vol. 65, No. 9, 2018, pp. 2832-2841.

Hajar et al., "Discrete random sampling: Theory and practice in machine monitoring," Mech. Syst. Signal Process., vol. 123, 2019, pp. 386-402.

Eng et al., "Frequency domain analysis of signals with stochastic sampling times," IEEE Trans. Signal Process., vol. 56, No. 7, 2008, pp. 3089-3099.

Bland et al., "The effect of sampling jitter in a digitized signal," in Proc. 1997 IEEE Int. Symp. Circuits Syst., vol. 4, 1997, pp. 2685-2688.

Tarczynski et al., "Spectral analysis of randomly sampled signals: suppression of aliasing and sampler jitter," IEEE Trans. Signal Process., vol. 52, No. 12, 2004, pp. 3324-3334.

Shapiro et al., "Alias-free sampling of random noise," Siam J. Appl. Math., vol. 8, No. 2, 1960, pp. 225-248.

Masry et al., "Alias-free sampling: An alternative conceptualization and its applications," IEEE Trans. Inf. Theory, vol. 24, No. 3, 1978, pp. 317-324.

* cited by examiner

SYSTEMS AND METHODS FOR SAMPLING SIGNALS TO DERIVE INFORMATION AT TARGET FREQUENCIES ABOVE A DETECTABLE RANGE

TECHNICAL FIELD

The subject matter described herein relates, in general, to sampling a signal to derive information, and, more particularly, to sampling the signal to derive the information from a target frequency outside a detectable range.

BACKGROUND

Electronic components process analog and digital signals for various applications. For example, a radar system in a vehicle measures the distance to surrounding vehicles using reflections of millimeters waves. A radio frequency (RF) system can also modulate analog signals with digital information for wireless communications at various frequencies. Systems receiving signals in these applications sample the signals at a certain frequency to detect information existing on frequency components. For instance, an analog-to-digital converter (ADC) in the RF system samples a signal and detects digital bits originally modulated by a transmitting system on a vehicle.

In various implementations, systems using an ADC detect frequency components from a signal below a Nyquist frequency through discrete samples. In signal processing, the Nyquist frequency is approximately half a sampling rate and defines a frequency range for a system to recover information without interference from aliasing. Here, aliasing is distortion from sampling that makes signal frequencies outside the frequency range indistinguishable. In conjunction with sampling, the system processes a sampled signal using a discrete Fourier transform (DFT) to derive alternative expressions from Fourier components of discrete information. However, frequency components outside the frequency range having information can go undetected in these systems from limitations associated with the Nyquist frequency and related aliasing effects. Furthermore, systems having tailored circuitry to suppress aliasing increases device complexity and costs.

SUMMARY

In one embodiment, example systems and methods relate to sampling signals to derive information from a target frequency outside a detectable range by exploiting physical phenomena. In various implementations, systems sampling signals to detect information for radar, wireless communications, and so on encounter difficulties from aliasing effects. For example, vehicle radar is unable to detect frequency components from a scattered signal on an object (e.g., a nearby vehicle) outside a Nyquist frequency. As such, the vehicle may misperceive the object from undetectable reflected signals at certain frequencies. Therefore, in one embodiment, a converter system samples a signal and extracts information from a target frequency outside the Nyquist frequency by exploiting random jitter and noise using existing hardware. In particular, the converter system extends the frequency range of the signal and detects target frequencies exceeding sampling limitations. The converter system achieves this by processing fluctuations in sampling times having random jitter generated by an oscillator. In one approach, the converter system computes a sample average of the sampling times using a discrete Fourier transform (DFT). Here, the converter system may detect information from a target frequency greater than the Nyquist frequency by observations within a detectable frequency range when amplitude power satisfies a threshold (e.g., expected power levels). A radar system, for example, utilizes such information with a perception system to detect objects at the target frequency that were previously undetectable. Accordingly, the converter system improves the detection of frequencies by expanding a detectable range through sampling with random jitter using existing hardware.

In one embodiment, a converter system to sample signals for deriving information from a target frequency outside a detectable range by exploiting physical phenomena is disclosed. The converter system includes a memory storing instructions that, when executed by a processor, cause the processor to sample, by a detector with an oscillator, a signal at sampling times to acquire a target frequency, the sampling times having an offset associated with random jitter and the target frequency is outside a detectable range for the sampling times. The instructions also include instructions to compute a sample average associated with the sampling times for component frequencies of the signal using a DFT. The instructions also include instructions, in response to the sample average satisfying a threshold for the target frequency, to extract information by the detector for the target frequency at one of the component frequencies. The instructions also include instructions to modify control of a device using the information.

In one embodiment, a non-transitory computer-readable medium to sample signals to derive information from a target frequency outside a detectable range by exploiting physical phenomena and including instructions that when executed by a processor cause the processor to perform one or more functions is disclosed. The instructions include instructions to sample, by a detector with an oscillator, a signal at sampling times to acquire a target frequency, the sampling times having an offset associated with random jitter and the target frequency is outside a detectable range for the sampling times. The instructions also include instructions to compute a sample average associated with the sampling times for component frequencies of the signal using a DFT. The instructions also include instructions, in response to the sample average satisfying a threshold for the target frequency, to extract information by the detector for the target frequency at one of the component frequencies. The instructions also include instructions to modify control of a device using the information.

In one embodiment, a method for sampling signals to derive information from a target frequency outside a detectable range by exploiting physical phenomena is disclosed. In one embodiment, the method includes sampling, by a detector with an oscillator, a signal at sampling times to acquire a target frequency, the sampling times having an offset associated with random jitter and the target frequency is outside a detectable range for the sampling times. The method also includes computing a sample average associated with the sampling times for component frequencies of the signal using a DFT. The method also includes, in response to the sample average satisfying a threshold for the target frequency, extracting information by the detector for the target frequency at one of the component frequencies. The method also includes modifying control of a device using the information.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments for sampling signals to derive information from a target frequency outside a detectable range by exploiting physical phenomena are disclosed herein. In various implementations, systems sampling signals to derive information from component frequencies encounter noise and unwanted aliasing interference. For example, a vehicle system is unable to reliably detect a component frequency outside the Nyquist frequency from aliasing effects during sampling. As such, the vehicle system fails to extract the information (e.g., vehicle-to-vehicle (V2V) data), which reduces system robustness, safety, and so on. Therefore, in one embodiment, a converter system samples a signal and acquires a component frequency outside detectable ranges by exploiting the non-linearity of an oscillator (e.g., a crystal oscillator) and avoiding hardware modifications. In one approach, an undetectable range is related to the Nyquist frequency and sampling times have an offset associated with random jitter from an analog-to-digital converter (ADC). Furthermore, the converter system computes a sample average associated with sampling times and component frequencies of the signal using a discrete Fourier transform (DFT). The converter system extracts information (e.g., V2V data) for the component frequency and other frequencies when the sample average satisfies a threshold. Here, the threshold may be the expected amplitudes of the component frequencies associated with probabilistic models. Accordingly, the converter system extracts information from component frequencies within detectable and undetectable ranges, thereby improving system robustness and performance.

In various implementations, the converter system extracts modulated data from a component frequency detectable through a sample average within predetermined timeframes above the threshold using the DFT. Also, the converter system extracts other information from undetectable frequency components above the Nyquist frequency having the sample average below the threshold. In this way, the converter system extracts information from the undetectable frequency component at detectable frequency points. Furthermore, the predetermined timeframes may vary for improving detection by increasing amplitude values relative to the threshold. Thus, the converter system improves system performance by detecting undetectable frequency components through exploiting signal processing and physical properties, thereby avoiding hardware modifications.

Figure 1:
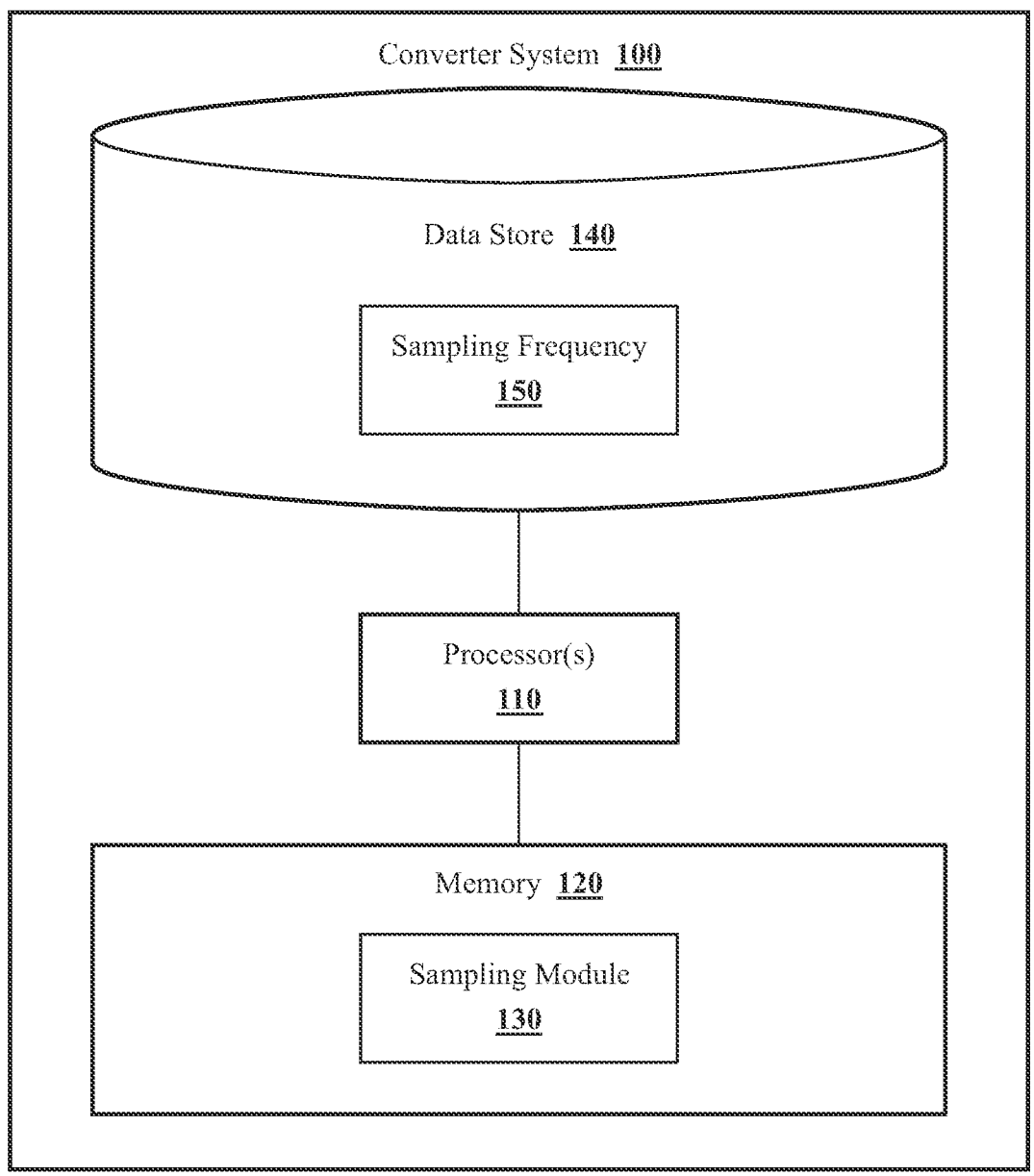
FIG. 1 illustrates one embodiment of a converter system that is associated with sampling a signal to derive information from a target frequency outside a detectable range.

Referring to FIG. 1, one embodiment of a converter system 100 that is associated with sampling a signal to derive information from a target frequency outside a detectable range is illustrated. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the converter system 100 that is implemented to perform methods and other functions as disclosed herein relating to improving sampling signals by deriving information from a target frequency outside a detectable range of existing hardware.

The converter system 100 is shown as including a processor(s) 110. In one embodiment, the converter system 100 includes a memory 120 that stores a sampling module 130. The memory 120 is a random-access memory (RAM), a read-only memory (ROM), a hard-disk drive, a flash memory, or other suitable memory for storing the sampling module 130. The sampling module 130 is, for example, computer-readable instructions that when executed by the processor(s) 110 cause the processor(s) 110 to perform the various functions disclosed herein.

Moreover, in one embodiment, the converter system 100 includes a data store 140. In one embodiment, the data store 140 is a database. The database is, in one embodiment, an electronic data structure stored in the memory 120 or another data store and that is configured with routines that can be executed by the processor(s) 110 for analyzing stored data, providing stored data, organizing stored data, and so on. Thus, in one embodiment, the data store 140 stores data used by the sampling module 130 in executing various functions. In one embodiment, the data store 140 includes the sampling frequency 150 used by an ADC of the converter system 100. Here, the Nyquist frequency may be within half of the sampling frequency 150. In signal processing, the Nyquist frequency is approximately half a sampling rate and defines a frequency range for the converter system 100 to acquire signals without aliasing.

Furthermore, the converter system 100 selects the sampling frequency 150 according to the application. For example, the sampling frequency 150 may be 15 MHz due to hardware or oscillator capabilities. As such, an ADC extracting information from a digital communication using 10 MHz channels encounters data with aliasing effects above the Nyquist frequency of 7.5 MHz. In the forthcoming examples, the converter system 100 exploits signal processing and hardware phenomena to detect component frequencies in these undetectable ranges while avoiding aliasing effects.

Still referring to FIG. 1, in one embodiment, the sampling module 130 includes instructions that cause the processor(s) 110 to detect a signal using a sampling frequency $f_s$ of 128 Hz. As explained below, the converter system 100 may process the signal with component frequencies equaling 28 Hz, 100 Hz, 156 Hz, and 228 Hz. The signal is processed so that the component frequencies have amplitude spectrums elevated at a common frequency. In particular, the converter system 100 can exploit the folding effect and repetition frequency of a DFT for undetectable frequencies. In this regards, FIG. 2 illustrates one embodiment of the converter system 100 using a DFT to detect a sampled signal outside the detectable range and also avoids aliasing effects.

Figure 2:
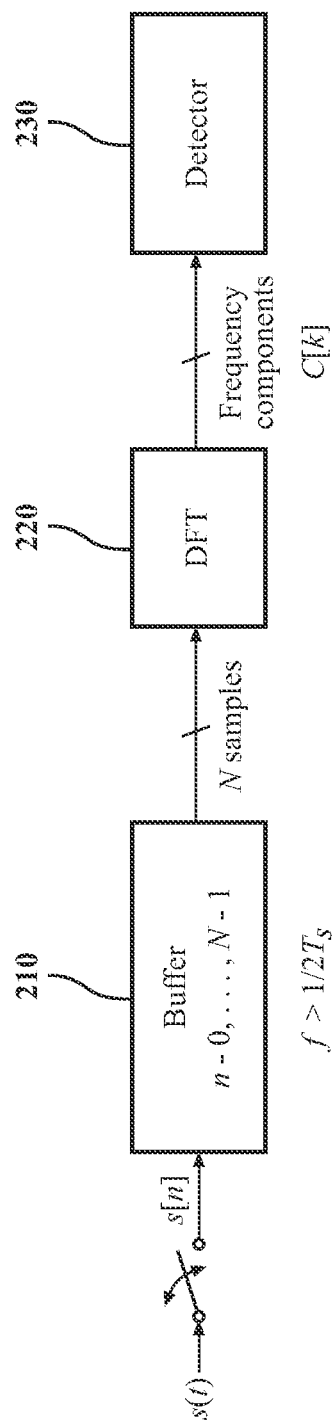
FIG. 2 illustrates one embodiment of the converter system using a discrete Fourier transform (DFT) to detect a sampled signal outside the detectable range.
Figure 3A:
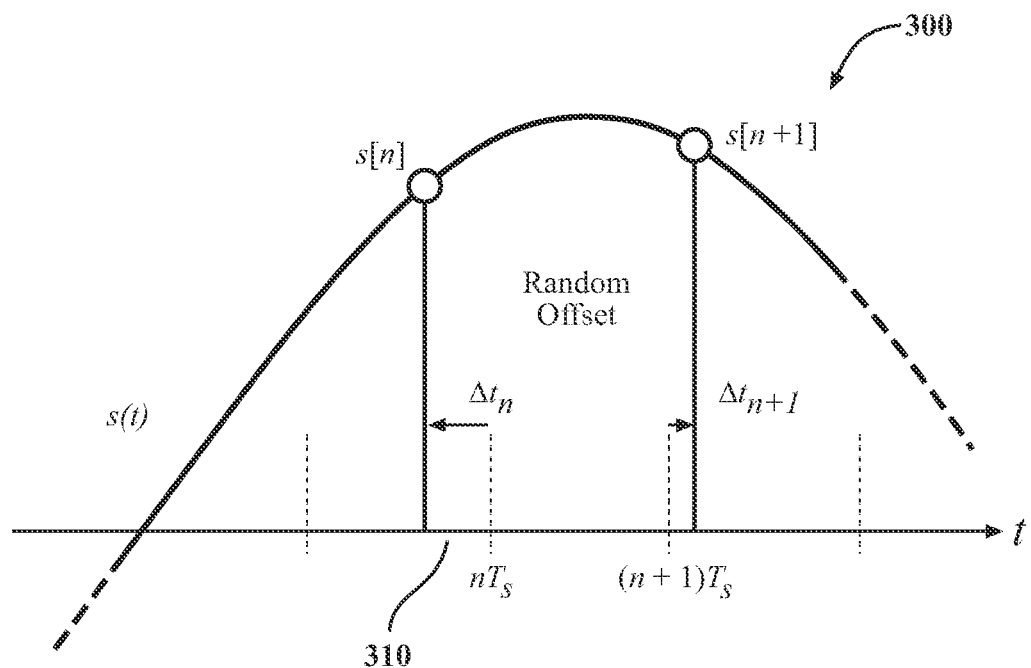
FIGS. 3A and 3B illustrate examples of the converter system exploiting random jitter during signal sampling for detection outside of a frequency range.

Now referring to FIG. 2, an input signal s(t) may be represented as $A \cos 2\pi f_c t$ where the sampling frequency $f_s = 1/T_s$ and $T_s$ is a sampling interval. The sequence after sampling may be represented as $s[n] = s(t = nT_s + \Delta t_n)$ and stored by the converter system 100 in the buffer 210. Here, as illustrated in FIG. 3A by signal 300, n is the sampling index variable from (0, . . . , N−1) for N samples. As illustrated by the offset 310, the sampling times $nT_s + \Delta t_n$ may fluctuate from random jitter. For example, the random jitter follows a Gaussian distribution such that $\Delta t_n \sim N(0, \sigma^2)$, where $\sigma^2$ is the variance. Physical phenomena may cause the random jitter. For instance, a material property or imperfection of a crystal oscillator used by an ADC for sampling causes the random jitter when subjected to atypical temperatures. In one approach, the converter system 100 purposefully injects an offset for the sampling times and causes the random jitter using an electrical circuit (e.g., a noise generator). The electrical circuit may also use existing components (e.g., a clock generator) of the converter system 100, thereby reducing hardware costs. In this way, as explained below, the converter system 100 detects component frequencies outside a detectable range associated with the Nyquist frequency using existing hardware and avoids aliasing effects.

Figure 3B:
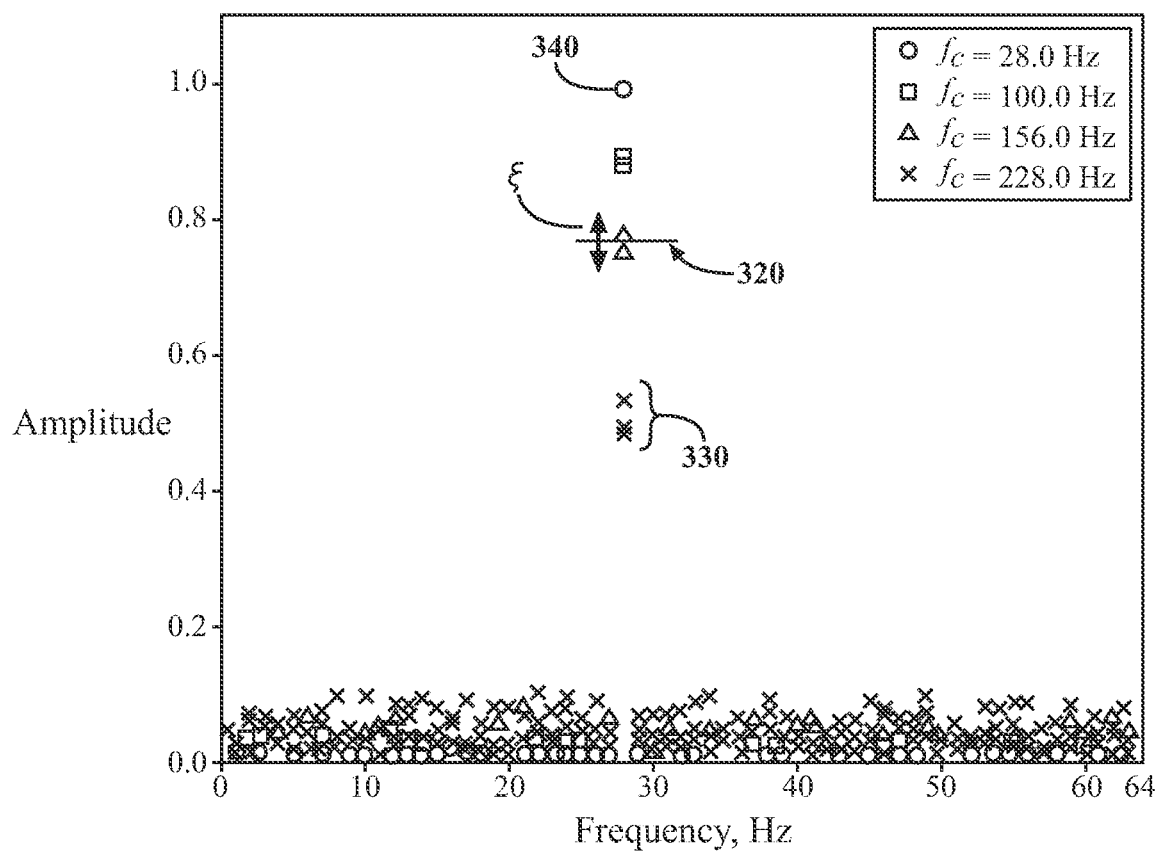

In one approach, the DFT 220 uses N samples of the input signal for computing representations in the frequency domain. The DFT 220 outputs the component frequencies C[k] (k=0, 1, . . . , N−1) for detection by the detector 230 outside $f_s/2$. As illustrated in FIG. 3B, in one embodiment, the detector 230 computes expected values to acquire a signal frequency with target and component frequencies. The converter system 100 may derive expected values or estimate maximum likelihoods of component frequencies as follows. Component frequencies for N samples of the signal 300 after discretization are given as:

$$C[k] = \frac{1}{2\pi}\sum_{n=0}^{N-1} A\cos(2\pi f_c(nT_s + \Delta t_n))e^{-j\frac{2\pi n}{N}k} = \frac{A}{4\pi}\sum_{n=0}^{N-1}\left\{e^{-j\frac{2\pi n}{N}\left(k+\frac{N}{\alpha}\right)}e^{-j2\pi f_c \Delta t_n} + e^{-j\frac{2\pi n}{N}\left(k-\frac{N}{\alpha}\right)}e^{j2\pi f_c \Delta t_n}\right\}.$$

Equation (1)

Here, $\alpha = f_s/f_c$ and k is associated with discretized frequencies $$k * \frac{f_s}{N}$$

of the signal 300. Also, the converter system 100 may set $k_1 = N/\alpha$ and $k_2 = (N - N/\alpha)$ according to system applications (e.g., quantum sensing, wireless transmission, etc.)

Moreover, in at least one approach, the converter system 100 performs the following computations for component frequencies $k_1$ and $k_2$:

$$C[k_1] = \frac{A}{4\pi}\sum_{n=0}^{N-1}\left\{e^{-j2\pi f_c(\Delta t_n + 2nT_s)} + e^{j2\pi f_c \Delta t_n}\right\},$$

Equations (2) and (3)

$$C[k_2] = \frac{A}{4\pi}\sum_{n=0}^{N-1}\left\{e^{j2\pi f_c(\Delta t_n + 2nT_s)} + e^{-j2\pi f_c \Delta t_n}\right\}.$$

Here, $C[k_2]$ can represent a folding component of $C[k_1]$ such that $C[k_1]$ approximately equals $C[k_2]$. The converter system 100 computes expected values for the component frequencies when the sequence of jitter $\Delta t_1, \Delta t_2, \ldots, \Delta t_N$ is given. In one approach, these jitter values are random variables. As such, a probability density function of a random variable X and joint probability of random variables $X_1$ and $X_2$ by p(X) and $p(X_1, X_2)$, respectively, are expressed as:

$$E[C[k_1]] = $$

Equation (4)

$$\int_{\Delta t_1} \cdots \int_{\Delta t_N} C[k_1]p(\Delta t_1, \Delta t_2, \ldots, \Delta t_N)d\Delta t_1 d\Delta t_2 \ldots d\Delta t_N = $$

$$\frac{A}{4\pi}\int_{\Delta t_1} \cdots \int_{\Delta t_N}\left\{\sum_{n=0}^{N-1} e^{-j2\pi f_c(\Delta t_n + 2nT_s)} + e^{j2\pi f_c \Delta t_n}\right\}p(\Delta t_1)p(\Delta t_2) \ldots p(\Delta t_N)d\Delta t_1 d\Delta t_2 \ldots d\Delta t_N = $$

$$\frac{A}{4\pi}\sum_{n=0}^{N-1}\left\{e^{-j2\pi f_c(2nT_s)}\int_{\Delta t_n} e^{-j2\pi f_c \Delta t_n}p(\Delta t_n)d\Delta t_n + \int_{\Delta t_n} e^{j2\pi f_c \Delta t_n}p(\Delta t_n)d\Delta t_n\right\}.$$

In Equation (4), $\Delta t_n$ for n=1, 2, . . . N exhibits properties of independent and identically distributed random variables. The characteristic function related to an integral(s) of Equation (4) can be expressed as:

$$\int_{\Delta t_n} e^{j2\pi f_c \Delta t_n}p(\Delta t_n)d\Delta t_n = \int_{\Delta t_n} e^{-j2\pi f_c \Delta t_n}p(\Delta t_n)d\Delta t_n = e^{-2\pi^2 f_c^2 \sigma^2},$$

Equation (5)

which reduces Equation (4) to the expression:

$$E[C[k_1]] = $$

Equation (6)

$$\frac{A}{4\pi}e^{-2\pi^2 f_c^2 \sigma^2}\left(\sum_{n=0}^{N-1} e^{-4\pi f_c T_s n} + N\right) = \frac{AN}{2\pi}e^{-2\pi^2 f_c^2 \sigma^2}.$$

Similarly, the converter system 100 may compute the expected value of $k_2$ as:

$$E[C[k_2]] = \frac{AN}{2\pi}e^{-2\pi^2(f_c - f_s)^2 \sigma^2}.$$

Equation (7)

Regarding variance, the converter system 100 can observe the variance in random jitter by applying $\sigma = 0.1 T_s$ and $\sigma = 0.1 T_s$. For example, a DFT for a signal frequency $f_c$ with amplitude A=1.0, sampling frequency $f_s$=128 Hz, DFT size N=128, and normalization $2\pi/N$ can be computed as:

$$C_{DFT}[k] = \frac{1}{2\pi}\sum_{n=0}^{N-1} s[n]e^{-j\frac{2\pi k}{N}},$$

Equation (8)

including a random jitter of $\Delta t_n$.

Moreover, in one embodiment, the converter system 100 calculates amplitude using a random distribution N (0,$\sigma^2$) and a sample average that is fixed (e.g., $N_{DFT}$=100). In this approach, the converter system 100 computes that the expected value of E[C[k₁]] decreases as the signal frequency increases, and eventually goes to zero. Here, C may fluctuate according to $N_{DFT}$ and inputted noise. In a different approach, the sample average varies according to a timeframe derived using the component frequencies and a target frequency (e.g., $f_c$). In this way, the converter system 100 optimizes the acquisition of $f_c$ by observing elevated amplitude values. Accordingly, the converter system 100 detects component frequencies above the Nyquist frequency by exploiting linearity and fluctuations.

Still referring to FIG. 3B, the parameter ξ320 may be a theoretical value for E[C[f]] that the converter system 100 uses as a threshold by computing:

$$E[C[f]] = \frac{A}{4\pi} e^{-2\pi^2 f^2 \sigma^2}. \qquad \text{Equation (9)}$$

In this example, the converter system 100 acquires signals 100 Hz, 156 Hz, and 228 Hz at 28 Hz using $f_s$=128 Hz and random jitter $\Delta t_n$. A sample average computed by the DFT 220 for an $f_c$ may be in a focused region for amplitudes when $|C-C_{theory}|<\xi$, where $C_{theory}$ is:

$$C_{theory} = \frac{AN}{2\pi} e^{-2\pi^2 f_c^2 \sigma^2}. \qquad \text{Equation (10)}$$

Here, the absolute values 330 of amplitudes associated with 228 Hz are below threshold ξ320 and yet elevated for acquisition by the detector 230. At 28 Hz, the component frequency of 28 Hz is also detectable at amplitude 340 above the threshold ξ320 for the sample averages. Thus, the converter system 100 and the detector 230 acquire various component frequencies at 28 Hz by exploiting or injecting jitter in computations and sampling.

Figure 4:
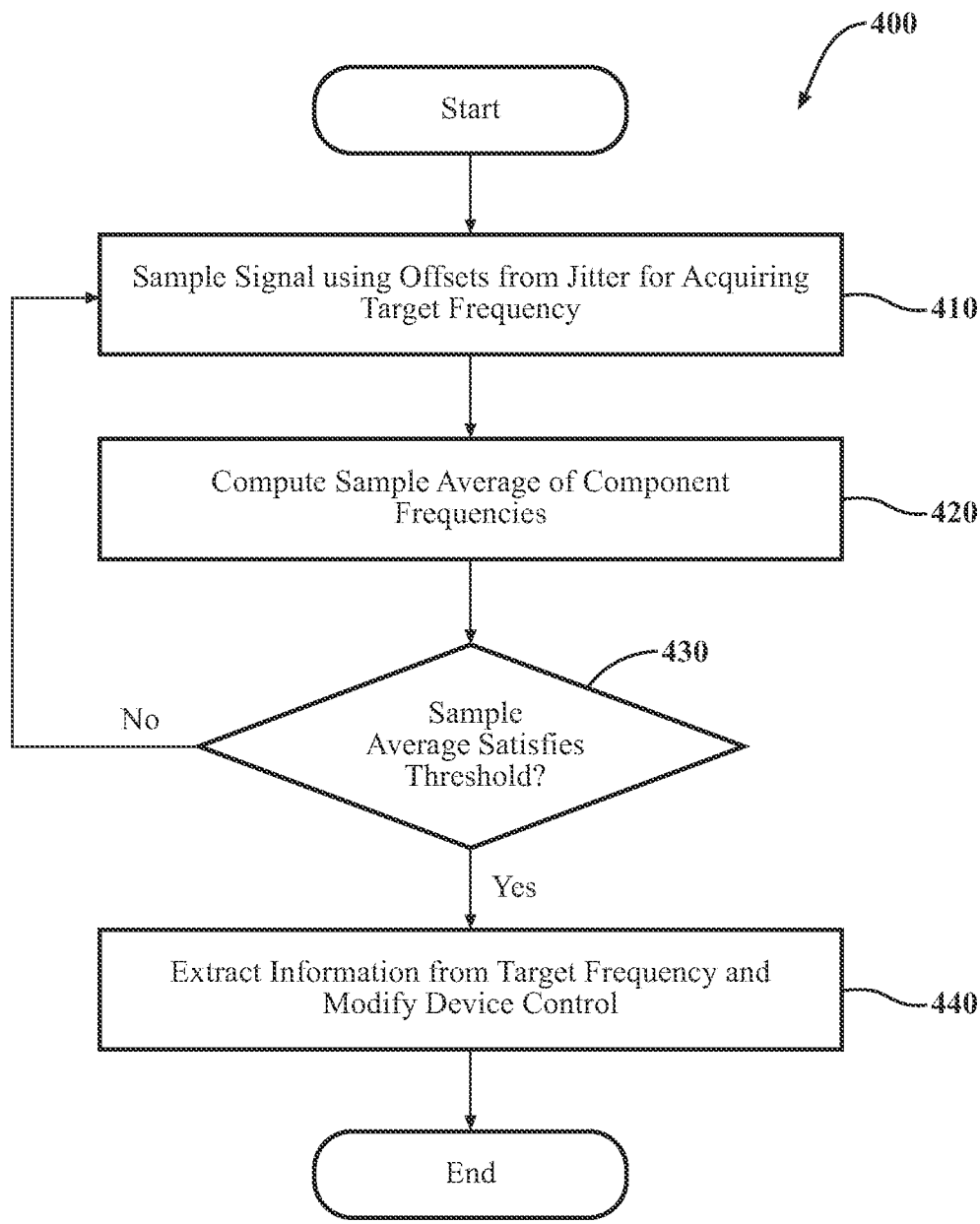
FIG. 4 illustrates one embodiment of a method that is associated with sampling signals to derive information from component frequencies and a target frequency outside the detectable range.

Turning now to FIG. 4, a flowchart of a method 400 that is associated with sampling signals to derive information from component frequencies and a target frequency outside a detectable range is illustrated. Method 400 will be discussed from the perspective of the converter system 100 of FIG. 1. While method 400 is discussed in combination with the converter system 100, it should be appreciated that the method 400 is not limited to being implemented within the converter system 100 but is instead one example of a system that may implement the method 400.

At 410, the converter system 100 samples a signal using offsets from jitter for acquiring a target frequency. Here, the target frequency is $f_c > f_s/2$ and jitter may be random jitter following a distribution N (0,σ²), where σ² is the variance. The sampling times can include samples offset by jitter and those excluding offsets within a timeframe, thereby improving sample diversity. Furthermore, the converter system 100 uses a sampling frequency according to hardware capabilities and applications. For example, a vehicle sampling signals from a quantum sensor uses a sampling frequency from a wide range while a radar system uses a narrower range. In either case, the sampling frequency is bounded by the hardware capabilities of the oscillator or clock used by the converter system 100. For instance, an oscillator with an operating range of 28 Hz-128 Hz has an upward bound for detectable frequencies. In this case, the converter system 100 may detect signals up to a Nyquist frequency of 64 Hz (i.e., half of 128 Hz).

As previously explained, the converter system 100 samples the signal so that various component frequencies have amplitude spectrums elevated at a common or component frequency. In particular, the converter system 100 exploits the jitter existing or introduced by an oscillator as an offset for sampling times. For example, physical phenomena cause random jitter from a material property or imperfection of a crystal oscillator used by an ADC during atypical operating temperatures. In another approach, the converter system 100 injects an offset for the sampling times that causes the random jitter, such as using an electrical circuit (e.g., noise generator) from existing components. In this way, the converter system 100 reliably detects component frequencies outside a detectable range associated with the Nyquist frequency using existing hardware while avoiding aliasing effects.

At 420, the DFT 220 computes a sample average of component frequencies including a target frequency. For example, the sample average is:

$$C = \frac{C_{DFT}[W]_i}{N_{DFT}}, \qquad \text{Equation (11)}$$

where W=int($Nf_c/f_s$) is the index corresponding to the target frequency $f_c$ and the int( ) converts the number into an integer value. As previously explained, the term $C_{DFT}[W]_i$ is the frequency component obtained from sampled data in the time duration of ($iNT_s$, $(i+1)NT_s$). Also, here the converter system 100 can exploit the folding effect and repetition frequency of a DFT for undetectable frequencies above the Nyquist frequency for certain component frequencies. As explained above, the DFT 220 can use N samples of the input signal for computing representations in the frequency domain. The DFT 220 outputs the component frequencies C[k] for detection outside the Nyquist frequencies by computing expected values. Here, the expected values may be associated with a probability density of component frequencies prominent in the signal, amplitude A, and variance σ².

At 430, the detector 230 compares the sample average to a threshold associated with the expectation values of the component and target frequencies. The threshold may be associated with theoretical values expected for the component frequencies. For example, absolute values of a target frequency above the Nyquist frequency satisfy the threshold being below and yet elevated for detectability. Another component frequency is also detectable at sample averages for amplitudes above the threshold. Here, the converter system 100 acquires the target frequency and the component frequency at a common frequency point within a detectable range set by the Nyquist frequency. Accordingly, the converter system 100 acquires a target frequency and component frequencies at a common frequency by exploiting jitter using existing hardware.

At 440, the converter system 100 extracts information from the target frequency and modifies device control. As explained in more detail by FIG. 5, the detector 230 is part of a radar system in a vehicle. The device can be an electronic control unit (ECU) for longitudinal control of the vehicle. The radar system may be unable to detect component frequencies from a scattered signal on an object (e.g., nearby vehicles) outside the Nyquist frequency. The converter system 100 processes data from the radar system to observe and acquire component frequencies above the Nyquist frequency having energized amplitudes. Accordingly, systems in the vehicle can detect approaching objects and modify longitudinal control (e.g., braking commands), thereby improving safety.

Figure 5:
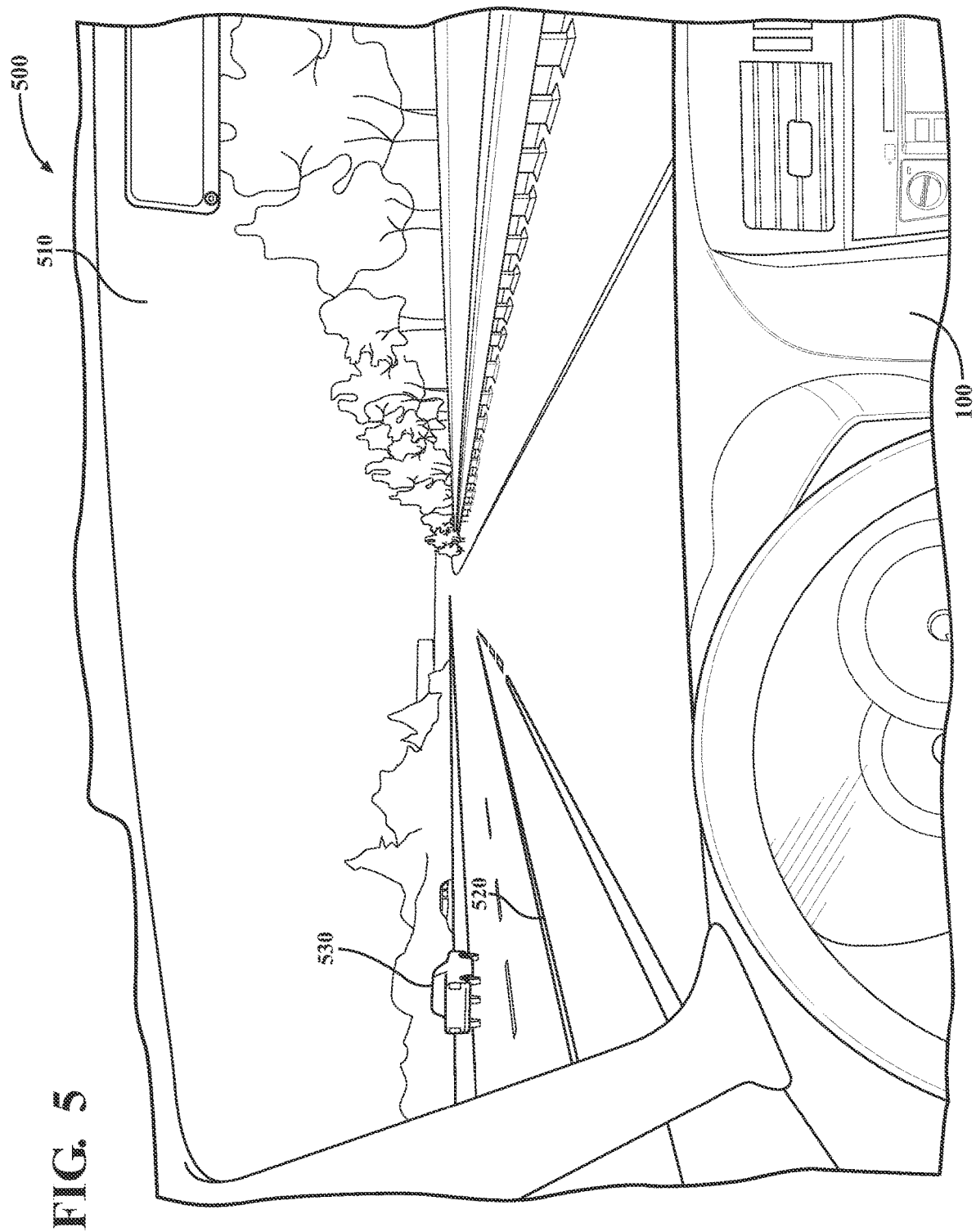
FIG. 5 illustrates an example of implementing the converter system in a vehicle to detect signals outside the detectable range.

Regarding further examples of vehicle implementations, FIG. 5 illustrates an example 500 of a vehicle 510 using the converter system 100. Here, the converter system 100 can detect signals outside the detectable range without aliasing effects while the vehicle 510 travels on the road 520. For example, a radar system receives a signal reflecting off the target vehicle 530. However, the signal has component and target frequencies above the Nyquist frequency. Hardware capabilities of an oscillator (e.g., a crystal oscillator) or clock used by an ADC of the vehicle 510 may bound the Nyquist frequency.

Moreover, the converter system 100 captures values at sampling times offset by the jitter from the oscillator associated with the ADC operation. As previously explained, a DFT computes a sample average used to acquire component frequencies within and outside of the Nyquist frequency. In particular, the converter system 100 may compare the sample average to a threshold associated with the expectation values of the component and target frequencies. The threshold can be associated with theoretical values expected for the component frequencies. For example, absolute values of a target frequency above the Nyquist frequency for the signal satisfy the threshold by being below and yet elevated. As such, the converter system 100 acquires the target frequency and the component frequency at a common frequency point within a detectable range set by the Nyquist frequency. Accordingly, the converter system 100 acquires a target frequency and component frequencies at a common frequency by exploiting jitter using the existing hardware of the vehicle 510.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM) or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., an application-specific integrated circuit (ASIC)), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a random-access memory (RAM), a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A converter system comprising:
a processor; and
a memory storing instructions that, when executed by the processor, cause the processor to:
sample, by a detector with an oscillator, a signal at sampling times and the signal includes a target frequency, the sampling times having an offset associated with the instructions that further cause an injection of random jitter injected by the converter system and the target frequency is outside a detectable range for the sampling times;
compute a sample average associated with the sampling times for component frequencies of the signal using a discrete Fourier transform (DFT);
in response to the sample average satisfying a threshold for the target frequency, extract data by the detector for the target frequency at one of the component frequencies; and
modify control of a device using the data.

2. The converter system of claim 1, wherein the instructions to extract the data further include to extract modulated data at one of the component frequencies having the sample average above the threshold and object reflections associated with a signal component having the sample average below the threshold.

3. The converter system of claim 2 further including instructions to vary a sampling quantity according to at least one of the component frequencies and the target frequency.

4. The converter system of claim 2 further including instructions to generate, by an electrical circuit, the random jitter for the oscillator according to the target frequency and a Nyquist frequency of the signal.

5. The converter system of claim 1, wherein the target frequency is outside a Nyquist frequency associated with a sampling frequency of the sampling times.

6. The converter system of claim 1 further including instructions to generate, by the oscillator, the random jitter during the sampling times, wherein the oscillator is a crystal oscillator associated with an analog-to-digital converter (ADC) and a material property of the crystal oscillator causes the random additional jitter.

7. The converter system of claim 1, wherein the threshold includes expected values of the component frequencies and the expected values have non-linear characteristics.

8. The converter system of claim 1, wherein the detector is associated with a radar system and the device is an electronic control unit (ECU) for longitudinal control of a vehicle.

9. A non-transitory computer-readable medium comprising:
instructions that when executed by a processor cause the processor to:
sample, by a detector with an oscillator, a signal at sampling times and the signal includes a target frequency, the sampling times having an offset associated with the instructions that further cause an injection of random jitter injected by the converter system and the target frequency is outside a detectable range for the sampling times;
compute a sample average associated with the sampling times for component frequencies of the signal using a discrete Fourier transform (DFT);
in response to the sample average satisfying a threshold for the target frequency, extract data by the detector for the target frequency at one of the component frequencies; and modify control of a device using the data.

10. The non-transitory computer-readable medium of claim 9, wherein the instructions to extract the data further include to extract modulated data at one of the component frequencies having the sample average above the threshold and object reflections associated with a signal component having the sample average below the threshold.

11. The non-transitory computer-readable medium of claim 10 further including instructions to vary a sampling quantity according to at least one of the component frequencies and the target frequency.

12. The non-transitory computer-readable medium of claim 10 further including instructions to generate, by an electrical circuit, the random jitter for the oscillator according to the target frequency and a Nyquist frequency of the signal.

13. The non-transitory computer-readable medium of claim 9 further including instructions to generate, by the oscillator, the random jitter during the sampling times, wherein the oscillator is a crystal oscillator associated with an analog-to-digital converter (ADC) and a material property of the crystal oscillator causes the random additional jitter.

14. A method comprising:
sampling, by a detector with an oscillator, a signal at sampling times and the signal includes a target frequency, the sampling times having an offset caused by an injection of random jitter and the target frequency is outside a detectable range for the sampling times;
computing a sample average associated with the sampling times for component frequencies of the signal using a discrete Fourier transform (DFT);
in response to the sample average satisfying a threshold for the target frequency, extracting data by the detector for the target frequency at one of the component frequencies; and
modifying control of a device using the data.

15. The method of claim 14, wherein extracting the data further includes extracting modulated data at one of the component frequencies having the sample average above the threshold and object reflections associated with a signal component having the sample average below the threshold.

16. The method of claim 15 further comprising varying a sampling quantity according to at least one of the component frequencies and the target frequency.

17. The method of claim 15 further comprising:
generating, by an electrical circuit, the random jitter for the oscillator according to the target frequency and a Nyquist frequency of the signal.

18. The method of claim 14, wherein the target frequency is outside a Nyquist frequency associated with a sampling frequency of the sampling times.

19. The method of claim 14 further comprising:
generating, by the oscillator, the random jitter during the sampling times, wherein the oscillator is a crystal oscillator associated with an analog-to-digital converter (ADC) and a material property of the crystal oscillator causes the random additional jitter.

20. The method of claim 14, wherein the threshold includes expected values of the component frequencies and the expected values have non-linear characteristics.

* * * * *

UNITED STATES PATENT AND TRADEMARK OFFICE
CERTIFICATE OF CORRECTION

| | | |
|---|---|---|
| PATENT NO. | : 12,399,953 B2 | Page 1 of 1 |
| APPLICATION NO. | : 17/980854 | |
| DATED | : August 26, 2025 | |
| INVENTOR(S) | : Yukihiro Tadokoro | |

It is certified that error appears in the above-identified patent and that said Letters Patent is hereby corrected as shown below:

In the Claims

In Claim 1, Column 12, Line 10, after "random jitter" remove "injected by the converter system"

In Claim 6, Column 12, Lines 37-39, after "claim 1" remove "further including instructions to generate, by the oscillator, the random jitter during sampling times"

In Claim 6, Column 12, Line 42, after "causes" remove "the random"

In Claim 9, Column 12, Line 58, after "random jitter" remove "injected by the converter system"

In Claim 13, Column 13, Lines 17 and 18, after "claim 9" remove "further including instructions to generate, by the oscillator, the random jitter during the sampling times"

In Claim 13, Column 13, Line 21, after "causes" remove "the random"

In Claim 19, Column 14, Lines 22-24, after "claim 14" remove "further comprising: generating, by the oscillator, the random jitter during sampling times"

In Claim 19, Column 14, Line 27, after "causes" remove "the random"

Signed and Sealed this
Thirtieth Day of September, 2025

John A. Squires
*Director of the United States Patent and Trademark Office*